United States Patent [19]
Konersmann et al.

[11] 3,994,098
[45] Nov. 30, 1976

[54] APPARATUS FOR REGULATING THE LAPPING PRESSURE DURING LAPPING OF TWO BEVEL GEARS IN A LAPPING MACHINE

[75] Inventors: Erhard Konersmann, Zurich; Rudolf Gruber, Bichelsee, both of Switzerland

[73] Assignee: Werkzeugmaschinenfabrik Oerlikon-Buhrle AG, Zurich, Switzerland

[22] Filed: June 2, 1975

[21] Appl. No.: 582,748

[30] Foreign Application Priority Data
June 6, 1974 Switzerland............... 7711/74

[52] U.S. Cl........................................ 51/26; 90/7
[51] Int. Cl.² ................ B24B 15/00; B24B 15/08; B23F 1/00; B23F 21/12
[58] Field of Search............... 51/26, 165.77, 165.9, 51/165.91, 287; 90/7

[56] References Cited
UNITED STATES PATENTS

| | | |
|---|---|---|
| 2,904,934 | 9/1959 | Schicht.................................. 51/26 |
| 3,634,974 | 1/1972 | Kikuchi.......................... 51/165.9 X |
| 3,672,100 | 6/1972 | Pesante........................... 51/165.77 |
| 3,728,826 | 4/1973 | Wada.............................. 51/165.77 |
| 3,742,653 | 7/1973 | Kano................................ 51/165.9 |

*Primary Examiner*—Gary L. Smith
*Attorney, Agent, or Firm*—Werner W. Kleeman

[57] ABSTRACT

An apparatus for regulating the lapping pressure during the lapping of two bevel gears at a lapping machine comprising a device for driving one of the bevel gears and for braking the other bevel gear. A control mechanism for adjusting the desired lapping pressure. A differential pressure transmitter is operatively connected with the control mechanism, said differential pressure transmitter serving to measure the liquid-pressure differential brought about by the bearing load in a hydrostatic bearing of one bevel gear in order to regulate the lapping pressure as a function of the bearing load at the aforesaid drive- and braking device.

3 Claims, 4 Drawing Figures

3,994,098

APPARATUS FOR REGULATING THE LAPPING PRESSURE DURING LAPPING OF TWO BEVEL GEARS IN A LAPPING MACHINE

BACKGROUND OF THE INVENTION

The present invention relates to a new and improved construction of apparatus for regulating the lapping pressure during the lapping of two bevel gears at a lapping machine, said apparatus being of the type incorporating a device for driving the one bevel gear and for braking the other bevel gear and further including a control mechanism for adjusting the desired lapping pressure.

With a state-of-the-art apparatus of this general type there are provided two direct-current motors for the respective drive of the one bevel gear and for braking the other bevel gear. With the aid of a control mechanism or device there are compared with one another the drive moment of the one motor and the braking moment of the other motor by means of the current of the direct-current motors and such drive moment and braking moment adjusted to a desired reference value.

It has however been found that the lapping pressure, i.e. the force with which the teeth flanks which slide upon one another are pressed against one another, is not solely dependent upon the rotational moment. In the case of special transmissions or gearings with extreme displacement of the axle it is however important to be able to determine the lapping pressure itself and not only the aforementioned rotational moment. The prior art method thus has the drawback that the lapping pressure cannot be measured, only the rotational moment.

Thus, if there occurs, on the one hand, considerable deviations between the measured rotational moment and the actual lapping pressure and, if, on the other hand, it is necessary that certain bevel gears are only lapped with a slight lapping pressure, then the aforementioned apparatus is completely incapable of properly performing, especially if there are also to be taken into account disturbance magnitudes which are dependent upon the temperature and rotational speed.

SUMMARY OF THE INVENTION

Hence, with the foregoing in mind, it is a primary object of the present invention to provide an improved construction of apparatus for regulating the lapping pressure during the lapping of two bevel gears at a lapping machine in a manner not associated with the aforementioned drawbacks and limitations of the prior art proposals.

Another and more specific object of the present invention aims at the provision of a new and improved construction of apparatus by means of which it is possible to not only measure the rotational moment, rather there can be also measured the lapping pressure itself or at least a component thereof.

Now in order to implement these and still further objects of the invention, which will become more readily apparent as the description proceeds, the apparatus of this development is manifested by the features that there is provided a pressure differential transmitter for measuring the liquid-pressure differential brought about by the bearing load in a hydrostatic bearing of the one bevel gear and which pressure differential transmitter is connected to the control mechanism for the purpose of regulating the lapping pressure as a function of the bearing load at the aforementioned drive- and braking device.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE INVENTION

Figure 1:
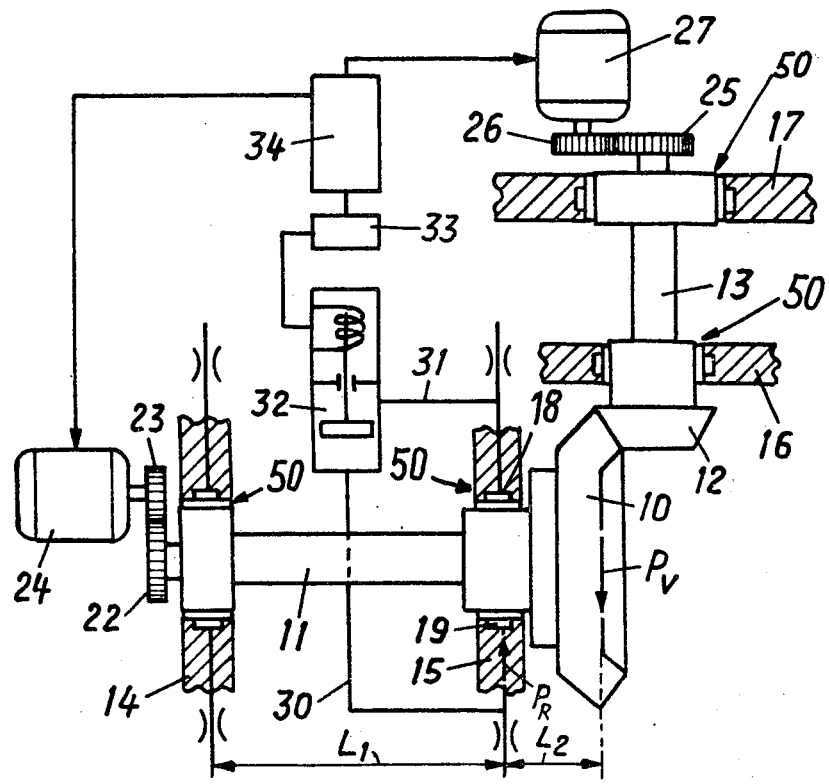
FIG. 1 schematically illustrates a lapping machine and the more essential components thereof.

Describing now the drawings, it is to be understood that only enough of the apparatus for the regulation of the lapping pressure during lapping of two bevel gears at a lapping machine, as contemplated by the invention, has been illustrated in the drawings to enable those skilled in the art to fully understand the underlying concepts of this development. Referring to FIG. 1 there will be recognized a spur bevel gear or axle-drive bevel wheel 10 — hereafter usually simply referred to as a bevel gear or spur bevel gear — which is suitably clamped at a first shaft 11. This first shaft 11 is mounted in a not in detail illustrated, yet conventional headstock-housing or compartment at two walls 14 and 15. Furthermore, a pinion or bevel gear 12 which is in meshing engagement with the spur bevel gear 10 is appropriately clamped at a second shaft 13. This second shaft 13 is likewise mounted in a conventional second headstock-housing or compartment, not shown in detail, in two walls 16 and 17. The shafts 11 and 13 are hydrostatically mounted i.e. in hydrostatic bearings, generally indicated by reference character 50. Each bearing 50, as best seen by referring to FIG. 2, possesses four support or carrier pockets 18, 19, 20, 21, wherein in FIG. 1 only the two support pockets 18, 19 are visible. Both of the headstocks are components of a not further illustrated lapping machine in which they are displaceable in conventional manner. The first shaft 11 is for instance driven via the gears 22, 23 by means of an electric motor 24 and the second shaft 13 is for instance braked via the gears 25, 26 by a second electric motor 27. Both of the support pockets 18, 19 (FIG. 1) are operatively connected via the conduits or lines 30, 31 with a pressure differential transmitter 32 which measures the difference between the pressure in the lower support pocket 19 and the pressure in the upper support pocket 18. Connected with the pressure differential transmitter 32 is a carrier frequency amplifier or carrier amplifier 33 which, in turn, is operatively connected with a control mechanism or device 34. By means of this control mechanism 34 the lapping pressure, during the lapping work, is maintained at a desired value in that, for instance, the drive force of the one electric motor 24 and the braking force of the other electric motor 27 are controlled.

Figure 3:
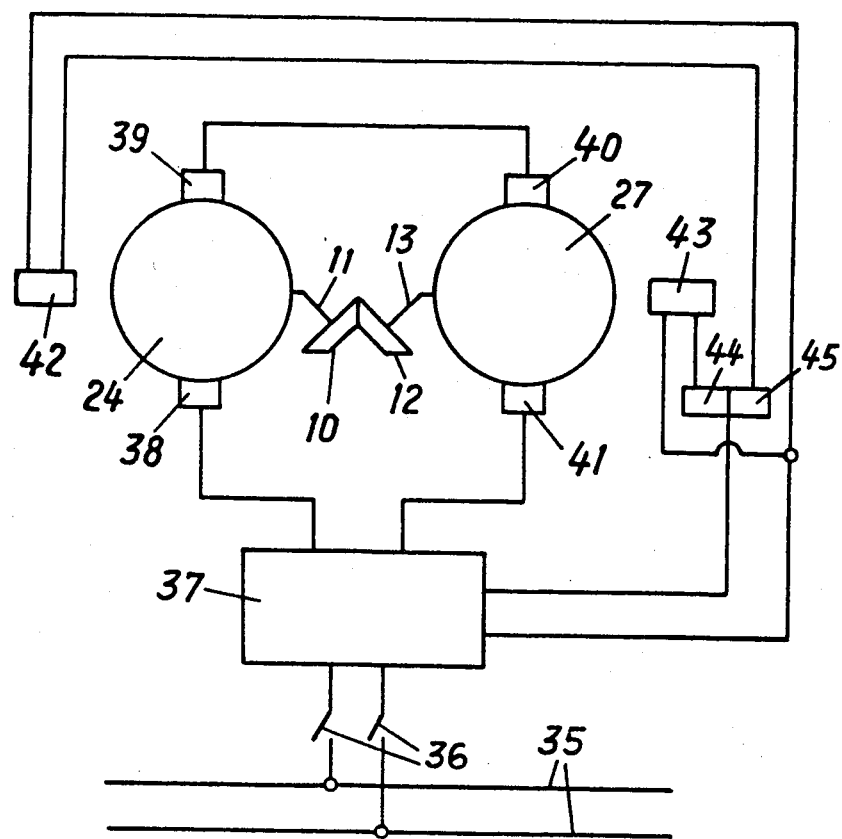
FIG. 3 is a schematic circuit diagram of an electric drive- and braking device for the lapping machine illustrated in FIG. 1.

A control suitable for this purpose has been illustrated in FIG. 3. The power supply to a thyristor device 37 occurs from an electrical power network 35 through the agency of a safety or protection device 36, the thyristor device 37 serving as a direct-current voltage source for the direct-current motors 24 and 27. The armatures 38, 39 and 40, 41 of both of the direct-current motors 24, 27, respectively, are connected in series with the armature voltage controlled by the thyristor device 37. The circuit connection of the direct-current motors 24, 27 furthermore is carried out such that the direct-current motor 24, 27 momentarily generating the braking force is connected with the direct-current power supply source 37 in a manner which opposes the direction of rotation imparted to it by the direct-current motor 27, 24 acting as the drive motor via the shafts 11, 13 and the bevel gears 10, 12. Both of the direct-current motors 24, 27 have associated therewith separately excited field windings 42, 43 which have available the excitation voltage from the direct-current supply source 37. At the direct-current supply source 37 there are connected in circuit therewith two potentiometers 44, 45 by means of which there can be realized a separate adjustment of the excitation voltage for the field windings 42, 43, and thus, there can be carried out an infinite regulation of the momentarily required braking moment. Both of the potentiometers 44, 45 can be actuated or adjusted by the control device or mechanism 34 illustrated in FIG. 1.

Figure 4:
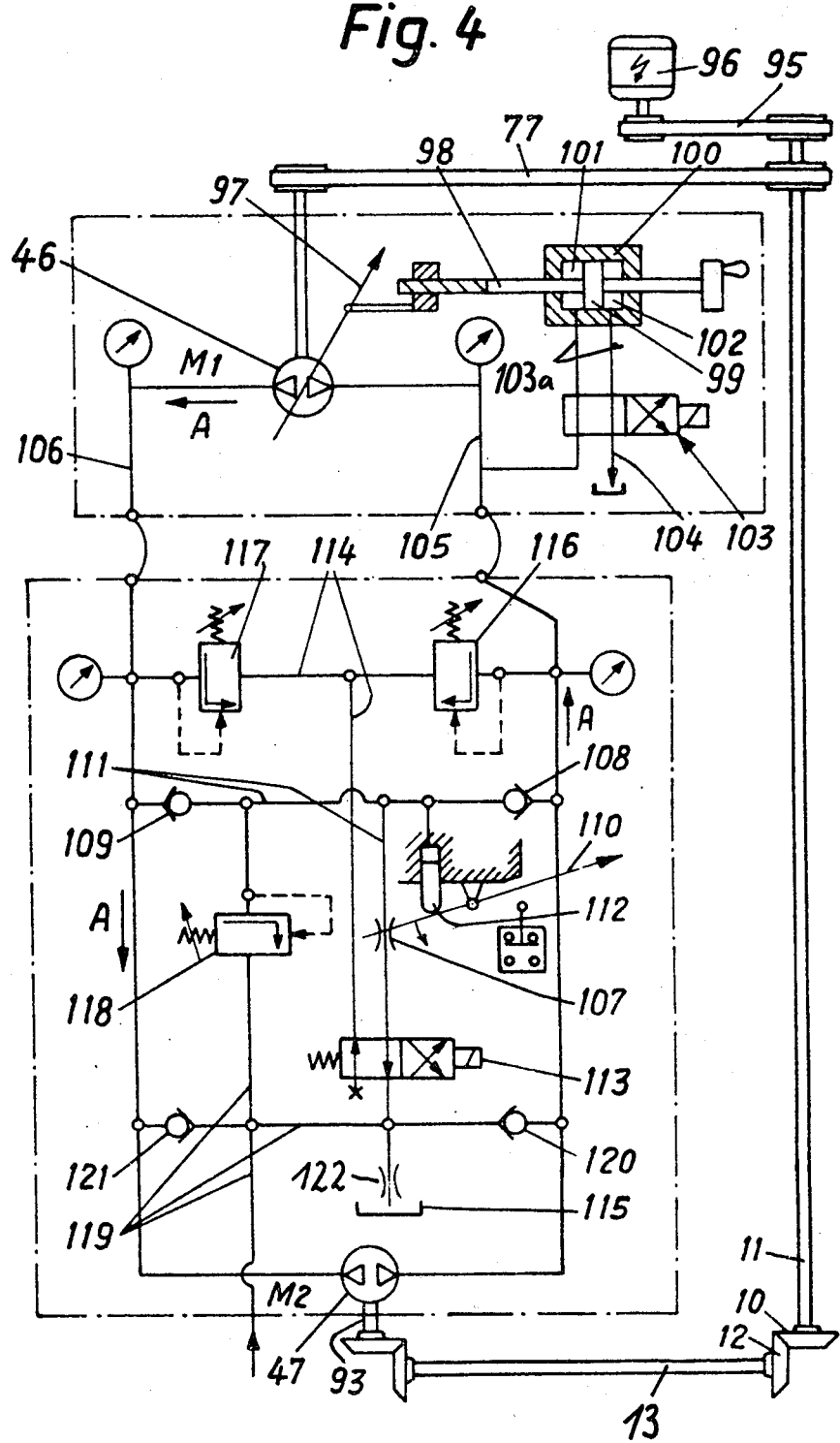
FIG. 4 is a schematic circuit diagram of a hydraulic drive- and braking device for the lapping machine illustrated in FIG. 1.

According to the showing of FIG. 4, instead of both of the direct-current motors 24, 27 there can be provided the hydraulic motors 46, 47. The one hydraulic motor 46 is operatively connected via a power transmission or gearing arrangement 77 with the shaft 11, and the other hydraulic motor 47 is operatively connected via a power transmission or gearing arrangement 93 with the shaft 13. The shaftt 11 is furthermore operatively coupled via a gearing arrangement or power transmission 95 with an electric motor 96.

The hydraulic motor 46 is constructed such that it also can act as a pump, so that it is possible to adjust the quantity of liquid which is conveyed during each revolution thereof. A lever 97 is operatively arranged at the motor 46 for the purpose of adjusting the quantity of liquid which is to be conveyed. This lever 97 is connected via a piston rod 98 with a piston or piston member 99 which is displaceably arranged within a cylinder 100. This cylinder 100 is subdivided by the piston 99 into two compartments or chambers 101 and 102. Both of the compartments 101 and 102 are connected via the conduits or lines 103a with an electrically actuatable control valve 103. Depending upon the position of this control valve 103 either the compartment or chamber 101 or the compartment or chamber 102 is flow connected with a discharge line or conduit 104, and at the same time in each case the other compartment or chamber 102 or 101, respectively, is flow connected with a pressure line or conduit 105. Depending upon which of the compartments 101 or 102 is connected with the pressure line 105 the piston 99 is located completely towards the left or completely towards the right of the showing of FIG. 4, and accordingly, the motor which functions as a pump delivers, as the case may be, a maximum or a minimum quantity of liquid.

Both of the hydraulic motors 46 and 47 are coordinated to one another in such a manner that the minimum quantity of liquid which is conveyed by the motor 46 is smaller than the quantity of liquid conveyed by the motor 47 and the maximum quantity of liquid conveyed by the motor 46 is greater than the quantity of liquid conveyed by the motor 47.

By means of the conduits or lines 105 and 106 both of the hydraulic motors 46, 47 are operatively connected with one another. The flow direction is indicated by the arrow A and is only dependent upon the direction of rotation of the electric motor 96. In the event that the conveyed quantity of liquid of the motor 46 is greater than that of the motor 47, then there prevails in the conduit 106 a greater pressure than in the conduit 105, and the motor 46 functions as a pump. On the other hand, if the conveyed quantity of liquid of the motor 46 is smaller than that of the motor 47, then there prevails in the conduit 105 a greater pressure than in the conduit 106, and the motor 47 acts as the pump. So that motor 47 can function as a pump 47 it must be driven by the electric motor 96 via the pinion 10 and the spur bevel gear 12. Otherwise the motor 47 drives the pinion 10 through the agency of the spur bevel gear 12.

In this way it is possible to lap both flanks of the teeth of the pinion 10 and the spur bevel gear 12 without reversing the direction of rotation of the electric motor 96. For manually adjusting the lapping pressure there is provided a throttle or throttle means 107 which is located in a discharge conduit or line 111. This throttle 107 is connected through the agency of a check or nonreturn valve 108 with the pressure conduit or line 105 and via a second check or nonreturn valve 109 with the conduit 106. The throttle or throttle means 107 is adjustable with the aid of a manually-operated or hand lever 110. The less the flow through the throttle 107 that much greater is the lapping pressure. In order that the operator can sense how large the lapping pressure in fact is, there is provided a piston 112 which, on the one hand, is supported at the manually-operated lever 110 and, on the other hand, is impinged by the pressure in the discharge conduit or line 111. The arrangement is undertaken such that with a constriction of the throttle 107 by means of the manually-operated lever 110, the pressure in the discharge or outflow conduit 111 increases and the piston is more intensely loaded, so that the resistance towards a further constriction of the throttle 107 increases.

In order to be able not only to manually adjust the lapping pressure but also automatically, there is provided an electrically actuatable control valve 113 which is operatively connected both with the discharge conduit or line 111 as well as also with a further discharge or outflow line or conduit 114. Depending upon the position of the control valve 113 either the discharge line or conduit 114 is closed and the discharge conduit or line 111 is open in the flow direction of a receptacle or trough 115, or the discharge conduit 111 is closed and the discharge conduit 114 is open in the flow direction of such trough or receptacle 115.

The discharge conduit 114 is connected, on the one hand, via a first pressure limiting or relief valve 116 with the pressure conduit 105 and, on the other hand, through the agency of a second pressure limiting or relief valve 117 with the conduit 106. Both of these pressure limiting or relief valves 116 and 117 are adjustable to a desired pressure by means of the control mechanism or device 34. When the control valve 113 is adjusted such that the discharge conduit or line 114 is open in the direction of the receptacle or trough 115, then the liquid flows either out of the conduit 105 or 106 via the pressure limiting valves 116 or 117, respectively, into the discharge conduit 114 as soon as the pressure in one of the conduits 105 or 106 is greater than the permissible pressure which has been adjusted at the pressure limiting or relief valves 116 and 117.

In order to prevent that there is adjusted an impermissibly great lapping structure either manually with the hand-operated or manually-operated lever 110 or automatically by means of the adjustable pressure limiting or relief valves 116 and 117, a safety or release valve 118 is connected with the discharge conduit or line 111. As soon as too great a pressure prevails in one of the conduits 105 or 106, then via the check valves 108 or 109, respectively, and the safety valve 118 liquid can flow into the receptacle or trough 115.

In order to be able to again replace the liquid which has flowed into the trough or receptacle 115 there is provided an infeed conduit or line 119 which is flow connected through the agency of the check valves 120 and 121 with the conduits or lines 105 and 106. In order to prevent liquid from directly flowing out of the infeed or delivery conduit 119 into the receptacle or trough 115 a throttle 122 is arranged over the vat or trough 115.

Figure 2:
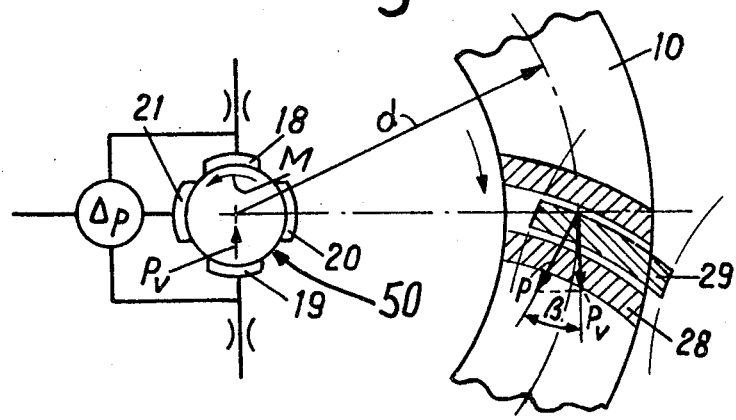
FIG. 2 is a diagram illustrating the forces effective during the lapping work.

Depending upon the magnitude of the braking moment the teeth of the spur bevel gear 10 and the pinion 12 are loaded to a greater or lesser extent, i.e. the lapping pressure is altered during the lapping work. The force P which is exerted by the lapping pressure from the spur bevel gear-teeth 28 at the pinion-teeth 29, as best seen by referring to FIG. 2, is perpendicular to the contact surface between the spur bevel gear-teeth 28 and the pinion-teeth 29. The force P possesses a vertical component $P_v$ which brings about a vertical loading of the hydrostatic bearing. Apart from the weight of the shaft 11 and the spur bevel gear 10 the support pocket 19 is furher loaded by this vertical component $P_v$. The pressure of the liquid in the lower support pocket 19 is thus greater than in the upper support pocket 18. This pressure differential is measured by the pressure differential transmitter 32 and the generated electrical signal is amplified in the carrier amplifier 33 and delivered to the control mechanism 34. The inherent weight of the shaft 11 and the spur bevel gear 10 can be eliminated with the aid of a suitable bridge circuit, so that the control mechanism or device 34 only has delivered thereto a signal which is proportional to the vertical force component $P_v$ of the lapping pressure. This signal is compared in conventional manner with the pre-selected or preset reference value of the lapping pressure, and in the event that deviations are present then the braking force of the motor 27 is controlled for such length of time until the lapping pressure again coincides with the reference lapping pressure.

In order to be able to properly adjust the braking moment the following values also are to be taken into account:

a. The diameter ($2d$) of the spur bevel gear, inasmuch as the braking moment M of the motor 27 is derived from the equation $M = P_v \cdot d$ (FIG. 2), wherein $P_v$ represents the vertical force component of the lapping pressure, and $d$ represents the radius of the spur bevel gear.

b. The spiral angle $\beta$ of the spur bevel gear teeth according to the equation $P_v = P \cdot \cos \beta$ (FIG. 2), wherein $P_v$ represents the vertical force component of the lapping pressure, and P represents the force exerted by the lapping pressure between the teeth 28, 29.

c. The spacing $L_2$ of the spur bevel gear from the hydrostatic bearing 50 closer to such gear (see FIG. 1) according to the equation $$P_R = P_v (1 + \frac{L_2}{L_1})$$

(FIG. 1), wherein $L_1$ represents the spacing between the walls 14 and 15, $P_v$ represents the vertical force component of the lapping pressure, and $P_R$ represents the force acting at the hydrostatic bearing 50 situated closer to the spur bevel gear 10.

The invention has been described by way of example in conjunction with two exemplary embodiments. However the invention is in no way intended to be limited thereto and at this point there will be mentioned still further modifications which can be undertaken for realizing still further exemplary embodiments.

a. The lapping pressure can be generated by a pre-biased spring and the pre-bias of the spring can be controlled by a pressure differential transmitter which measures the bearing load.

b. Instead of using two electric motors there can be employed hydro-motors, one of which drives the spur bevel gear and the other of which brakes the pinion, wherein the one or the other or both hydro-motors can be controlled by the pressure differential transmitter.

While there is shown and described present preferred embodiments of the invention, it is to be distinctly understood that the invention is not limited thereto, but may be otherwise variously embodied and practiced within the scope of the following claims. Accordingly,

What is claimed is:

1. An apparatus for regulating the lapping pressure during the lapping of two bevel gears at a lapping machine, comprising:
    a. means for driving and braking the one bevel gear;
    b. means for braking and driving the other bevel gear;
    c. a control mechanism for controlling said driving and braking means for both bevel gears;
    d. a pressure differential transmitter electrically connected with said control mechanism;
    e. hydrostatic bearing means for at least one of the bevel gears;
    f. said pressure differential transmitter measuring the liquid-pressure differential brought about by the bearing load at the hydrostatic bearing means of said one bevel gear for regulating the lapping pressure at said driving and braking means as a function of the bearing load.

2. The apparatus as defined in claim 1, wherein said driving and braking means comprises an arrangement wherein both of the bevel gears are selectively driven and braked by hydraulic motors, and adjustable throttle means for controlling the lapping pressure generated by the motors, said throttle means being adjustable as a function of the bearing load measured by the pressure differential transmitter.

3. The apparatus as defined in claim 1, wherein said driving and braking means comprises an arrangement wherein both bevel gears are selectively driven and braked by direct-current motors, said direct-current motors having field windings by means of which there can be delivered with the aid of potentiometers an adjustable excitation voltage, said potentiometers being adjustable as a function of the bearing load measured by the pressure differential transmitter.

* * * * *